United States Patent [19]

Carcey

[11] 4,240,780
[45] Dec. 23, 1980

[54] EQUIPMENT FOR SINTERING UNDER PRESSURE

[75] Inventor: Jacques P. Carcey, Charavines, France

[73] Assignee: Commissariat a l'Energie Atomique, Paris, France

[21] Appl. No.: 943,164

[22] Filed: Sep. 18, 1978

Related U.S. Application Data

[62] Division of Ser. No. 660,041, Feb. 23, 1976, abandoned.

[30] Foreign Application Priority Data

Feb. 27, 1975 [FR] France ................................ 75 06169

[51] Int. Cl.³ ............................................. B30B 15/02
[52] U.S. Cl. ...................................... 425/407; 425/78; 425/352; 425/411; 425/DIG. 35
[58] Field of Search ................ 425/78, 352, 407, 411, 425/DIG. 26, DIG. 35

[56] References Cited

U.S. PATENT DOCUMENTS

| | | | |
|---|---|---|---|
| 3,149,374 | 9/1964 | Wagner | 425/352 X |
| 3,294,878 | 12/1966 | Carnall et al. | 425/407 X |
| 3,555,597 | 1/1971 | Meadows | 425/DIG. 26 |
| 3,732,056 | 5/1973 | Eddy et al. | 425/352 |
| 3,797,986 | 3/1974 | Onder | 425/352 |
| 3,988,088 | 10/1976 | King et al. | 425/78 |

*Primary Examiner*—J. Howard Flint, Jr.
*Attorney, Agent, or Firm*—Frishauf, Holtz, Goodman & Woodward

[57] ABSTRACT

The materials to be sintered are placed in a deformable container which is in turn placed within a non-deformable treatment module equipped with heating means. The temperature of the container is increased under constant pressure until commencement of sintering. The temperature and pressure of the materials are increased simultaneously until sintering conditions are achieved, then maintained at a level stage for a predetermined period of time. The pressure is then reduced to the normal value while maintaining the temperature. The temperature is finally reduced to the room-temperature value.

2 Claims, 5 Drawing Figures

EQUIPMENT FOR SINTERING UNDER PRESSURE

This is a division of application Ser. No. 660,041, filed Feb. 23, 1976, now abandoned, which was continued by application Ser. No. 943,761, filed Sept. 20, 1978, on which was issued U.S. Pat. No. 4,216,017 of Aug. 5, 1980.

This invention relates to a module for sintering under pressure for obtaining ceramic materials, refractory materials or homogeneous metallic materials, of either uniform or composite structure.

It is seldom possible by known methods to exceed batch or unit manufacture of small samples or day-to-day capital immobilization in large and costly equipment.

Sintering under axial pressure in a nondeformable die between two punches has already undergone many changes which have tended to reduce the disadvantages of the process. Severe limitations in diameter still exist, however, for a number of reasons among which can be mentioned the following:

1. Irrespective of the type of insulation employed between the product and the die, adhesion to the walls and undesirable consolidations prevent the pistons from coming together. In powder metallurgy, this phenomenon is well-known in cold isostatic pressing and is accentuated at elevated temperatures. The product has a tendency to engage in the clearance space between the punch and the die and this also gives rise to an excessive increase in the radial component at the expense both of the real pressure applied to the product and the homogeneity of this latter. These are contributory factors in the short service life of conventional tool equipment which usually offers low resistance to applied stresses.

2. In any device of axial design and of revolution, an increase in diameter of the working zone results in displacement of the heating elements to a more distant location and in pistons of larger size which are conducive to axial cooling. The drawback cannot be overcome in practice by the use of heating dies. The use of short cycles accentuates this tendency since the time required to achieve homogenization of temperature is not attained.

Products which are treated under conditions of inhomogeneity of pressure and temperature have irregular structures and densities; during cooling, these are liable to introduce stresses which are detrimental to the practical utilization of the materials. In contrast to metallic products of higher plasticity in which the coefficient of expansion is little affected by the variation in porosity, ceramics or refractory materials in fact exhibit high sensitivity to inhomogeneities in density and in porosity at high density, such fragility being comparable with that which arises from thermal shock and temperature gradients.

3. The difficulties involved in providing chemcial and mechanical insulation between the product to be densified and tool equipment are also liable to increase the "fragilization" of the product. Surface adhesions of the order of 1 percent are sufficient to induce stresses in dense products which have a high degree of hardness, especially at the time of cooling under the action of dimensional variations of the molds.

The use of sintering under pressure in deformable dies offers an advantage in that the movement of closure of the pistons is no longer hindered and the pressure applied to the products can be transmitted almost entirely. But the application of this process in conventional equipment, furnaces and presses also has the effect of limiting their diameter by reason of the lack of uniformity of temperature. Moreover, the chemical and mechanical insulations remain insufficient and involve difficulty in product withdrawal.

The present invention overcomes the disadvantages of equipment of the prior art by providing a module for the fabrication of ceramic materials, refractory materials or homogeneous metallic materials having a uniform or composite structure and dimension which can attain and exceed one square meter.

The module of the invention is used in the following procedure:

placing of the materials to be sintered in a deformable container, placing of said container within a nondeformable treatment module provided with heating means, increase in temperature of said container under constant pressure until commencement of sintering of said material, simultaneous increases in temperature and in pressure until sintering of said material, maintenance of a level temperature and pressure stage for a predetermined period of time, reduction of the pressure to normal pressure while maintaining the temperature, reduction of the temperature to room temperature.

Such use of the modules of the invention makes it possible to obtain either uniform materials, that is to say materials constituted by a single element or a compound or composite materials comprising a plurality of elements or compounds presented in a very wide range of different forms such as wires, powders, strips and so forth.

The use of the container in accordance with the method is required for a number of reasons:

firstly it permits preconditioning of materials for easy handling, storage prior to treatment and final recovery after treatment without being subjected to stresses, it achieves chemical and mechanical insulation of materials at the time of sintering, if necessary, it produces a controlled atmosphere around the materials when means are provided for the introduction of said atmosphere, the materials are consolidated laterally until commencement of the sintering process, thus permitting elimination of initial inhomogeneities resulting from cold compression.

In order to carry out these different functions, the container must have a composite structure and necessarily has three independent portions forming a casing, a lateral wall made up of several elements completed by a bottom wall and a top closure. The geometry of said container determines the geometry of the end product. The powder which is placed within the container can be insulated from this latter by means of chemcial insulating materials (in order to prevent undesirable reactions between the powder and the container) and by means of mechanical insulating materials (in order to permit free interaction of the materials which are present).

For the fabrication of uniform sintered materials, namely materials having a base consisting of a single constituent, the container can be filled either with a slip or with a powder which may or may not be granular.

Densification by means of vibration can be carried out at the same time as the filling operation.

For the fabrication of composite sintered materials comprising a plurality of constituents, the materials are placed in the container by superposing the constituents in a suitable order.

The container which is filled with materials is placed in a nondeformable treatment module equipped with integrated heating means.

Chemical and mechanical insulation of the container with respect to the treatment module is performed in the manner which was described earlier in the case of insulation of the materials with respect to the container. In both cases, this insulation will be carried out for example by means of powder such as stabilized zirconia or by means of a metal plate.

The treatment module is divided into two sections between which the container is intended to be placed. Each section is equipped with resistance-type heating means or induction heating elements. In order to prevent overheating of the pistons, provision is made for heat-insulating elements which are capable of transmitting the pressure. Said elements may be completed if necessary by external cooling means.

Finally, the treatment module can advantageously comprise means such as bellows seals or san seals, for example, which are intended to produce a controlled atmosphere within the working zone.

The treatment using the module comprises in particular a temperature build-up under constant pressure unitl commencement of the sintering operation. The pressure employed during this stage is of a low order and does not call for a high-pressure press as in the following stages. In order to avoid the need for immobilization of a high-pressure press during all the stages of the process and to reserve the use of the press only when it is necessary, the treatment module is accordingly placed in a low-pressure press in this stage. An alternative expedient consists in providing means for application of stress such as springs or jacks which are rigidly fixed to the treatment module.

Immobilization of the high-pressure press solely during the treatment stages for which it is essential facilitates industrial production.

One of the dimensions in plan of the treatment module is practically unlimited, which means in other words that it can be given a very considerable length. In point of fact, the presses which are at present available are not well suited to the application of sintering processes.

The final stages of the process do not give rise to any particular difficulties. The rates of increase in temperature and in pressure, the level stages of temperature and pressure, the rates of decrease in temperature and pressure will be chosen as a function of the materials employed.

The module of the invention is particularly useful in a press in which the working zone is of large size and in which one dimension can attain several meters.

Such a press for use with the module of the invention is essentially formed by a bank of modular elements assembled together in the form of side-plates, each modular element being constituted by a rigid frame which surrounds a working zone, by at least one means for application of pressure, at least one supply of said pressure-application means for obtaining a uniform pressure within all the modular elements and by stiffening elements associated with said pressure-application means.

In respect of a given width, the press which is thus constituted by parallelepipedal elements assembled together in the form of side-plates permits an extension to any desired length simply by mounting modular elements in juxtaposed relation.

The pressure-application means which are constituted for example by hydraulic jacks are advantageously connected to each other and supplied by an oleopneumatic transformer.

The stiffening members can be constituted by sheet metal members, plates, rails, and the like, Said members ensure uniform transmission of pressure over the entire surface of the working zone which is obtained by juxtaposition of modular elements.

The stiffening members can be either stationary or movable in the horizontal direction, the alternative just mentioned being conducive to easier utilization.

In accordance with a preferential form of constuction of said press, the rigid frame is not constituted by a single member but by two rigid side-plates of smaller thickness which are assembled together by means of spacer members.

This alternative form of contruction has the advantage of great simplicity as well as lower capital cost.

A number of examples of application of the equipment for sintering under pressure in accordance with the invention will be given below without any limitation being implied. The practical arrangements which will be described in connection with these examples must be considered as forming part of the invention, it being understood that any equivalent arrangement could equally well be employed without thereby departing from the scope of the invention.

Reference will be made to the accompanying drawings which illustrate only the elements required for a proper understanding of the invention, identical reference numerals being assigned to corresponding elements in the different figures, and wherein.

Figure 1:
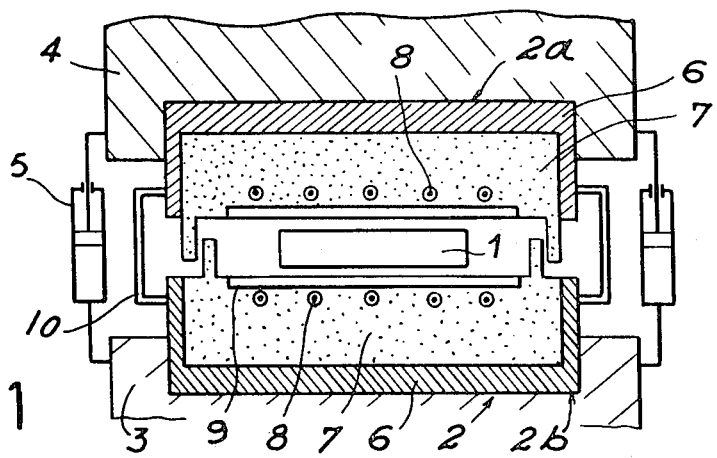
FIG. 1 is a sectional view of a high-pressure press in which there has been placed a treatment module fitted with a container.

As shown in FIG. 1, the container 1 is filled with material which is placed within a treatment module 2. The assembly consisting of container and module is placed between the bottom and top plates 3 and 4 of a high-pressure press. Pressure is applied to the complete assembly by means of the jack 5.

In accordance with the invention, the treatment module is divided into two sections 2a and 2b. These two sections are formed by U-section metallic members 6 which ensure rigidity of the treatment module. A packing 7 of refractory concrete which is placed within the members 6 ensures both pressure transmission to the container 1 and thermal insulation of the plates 3 and 4 when voltage is applied to the heating resistors 8. Said resistors 8 are intended to bring the container 1 to the sintering temperature by means of conductive plates 9. A metallic seal 10 constituted by a bellows element makes it possible to operate in a controlled atmosphere.

Figure 2:
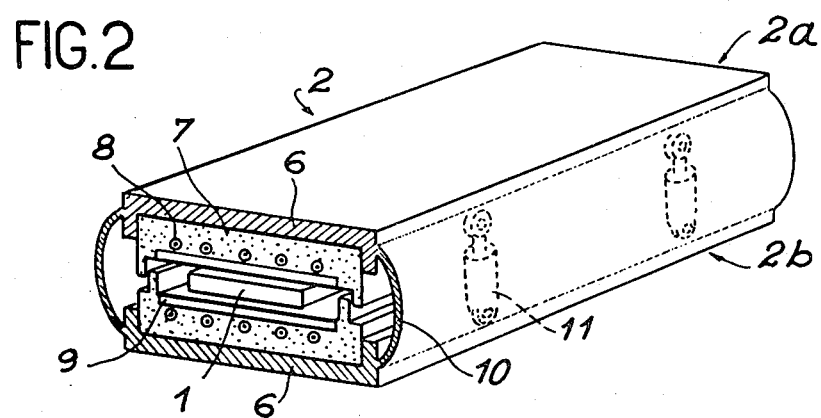
FIG. 2 is a sectional view in perspective showing a treatment module into which a container has been introduced.

FIG. 2 shows a portion of a treatment module which is in readiness. The pressure is maintained constant by the jack 11 whilst the temperature is increased by means of the heating resistors 8. The stage of the process takes place away from the high-pressure press, thus making it possible to use this latter for other purposes.

FIG. 3 shows a modular press of the high-pressure type for use with modules of the invention.

Figure 3A:
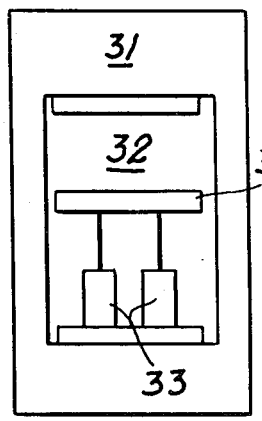
FIG. 3 shows three views of a modular press of the high-pressure type in accordance with the invention.
Figure 3B:
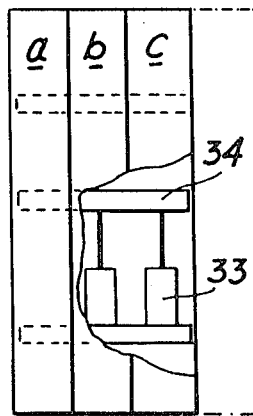
Figure 3C:
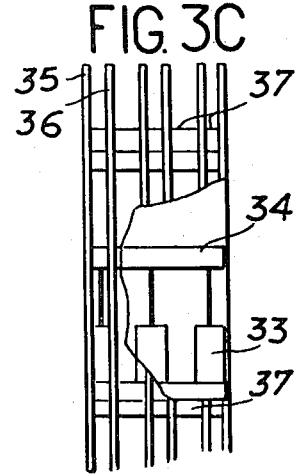

FIG. 3a is a front view of the press showing the first module; FIG. 3b is a profile view of the same press showing the successive modular elements a, b, c, etc.

FIG. 3a shows a front view of a modular element whilst FIG. 3b illustrates a set of modular elements which have been partially cut away and show the position of the jacks.

A frame 31 having an open central portion for the arrangement of a working zone 32 is shown in FIG. 3a. Two hydraulic jacks 33 which are placed at the lower end of the frame serve to apply the desired pressure. Said two jacks are associated with a stiffening member 34.

There can be seen in FIG. 3b three assembled modular elements (a, b, c). The cutaway portion reveals the jacks 33 which are supplied in parallel by means of pipes (not shown in the figure). The stiffening member 34 ensures a uniform pressure over the entire application surface.

In accordance with a preferential embodiment, the rigid frame of each modular element is constructed by means of rigid side-plates 35 and 36 of small thickness (FIG. 3c) which are assembled together by means of spacer members 37; the bottom spacer member serves as an abutment for the jacks.

EXAMPLE 1

The starting product is a garnet powder consisting of $Gd_3Fe_5O_{12}$ or $Y_3Fe_5O_{12}$ having a mean grain size of the order of 300 A.

The product is poured in an alcohol slip into a container formed of refractory steel with a top closure and a bottom wall having a thickness of 0.5 mm which are joined to a lateral portion of greater thickness made up of four sections so as to form a volume of 120×200×40 mm. The sections are assembled together by means of wires of the same material. The product is insulated from the container by means of stabilized zirconia in powdered form. The temperature is increased at 200° C./hr up to 900° C. under a stand-by pressure of 36 kg/cm². On commencement of shrinkage, the pressure is increased to 220 kg/cm²/hour up to a level stage of 350 kg/cm² whilst the temperature is increased to 1200° C. at the same rate.

Densification (level stage) is obtained in one hour. Decompression is carried out at 400 kg/cm²/hour at constant temperature (1200° C.). Reduction to room temperature is then carried out at 300° C./hour.

The products obtained have a density which is higher than 99.8% of the theoretical density. They have the appearance of thin transparent strips having a thickness of 20μ and a uniform particle size which is smaller than 2.7μ. These products can be employed in the fabrication of magneto-optical memories.

EXAMPLE 2

The starting material is titanium zirconate of lead. It is placed within a container having a bottom wall and top closure formed by a sheet of 18/8 steel having a thickness of 0.5 mm and lateral faces of baked clay elements. The product is insulated by stabilized zirconia in grains of 0.2 to 0.5 mm which has been precompacted by vibrations. The container is insulated from the work surface also by means of stabilized zirconia. The treatment module is formed in hollow structures of Norton furnace plates of SiC. The heating elements of SiC are fitted within recesses. The complete assembly is subjected to the following treatment cyles: temperature rise from 200° C./hr to 300° C./hr under a stand-by pressure of 40 kg/cm² up to commencement of sintering (940° C.). The pressure is then increased simultaneously with the temperature and attains a level-stage value of 150 kg/cm² and a temperature of 1180° C. This level-stage value is maintained for a period of 30 minutes. Normal pressure is then restored at a rate of 300 kg/cm²/hr followed by the temperature at a rate of 200° C./hr.

The ceramics thus obtained have a density which is higher than 99.8% of theoretical density, a uniform grainsize distribution within the range of 0.5 to 1.2μ.

The piezoelectric characteristics are appreciably higher than conventional values.

I claim:

1. A treatment module for use in a press having a top plate and a bottom plate substantially parallel to each other and means for pressing said top plate towards said bottom press plate so as to compress an object between said plates selectively at a constant pressure or at an increasing pressure, for sintering under pressure, comprising:

an essentially non-deformable upper element (2a) and an essentially non-deformable lower element (2d) connected by flexible means (10) for holding said upper and lower members in proximity to each other while allowing them to be moved together or apart, said upper and lower elements each containing heating means interposed between an upper and lower face plate of the element, said plates of each element being rigidly spaced apart by a compression-withstandiing filling in which said electrical heating means are embedded, and a composite container for containing material to be sintered under compression and heat, said container having a bottom wall and a top closure substantially opposite said bottom wall and also a lateral wall formed by a plurality of elements which cooperate with said bottom wall and said top closure to constitute a composite container capable of being deformed in the event the contents thereof spread laterally when pressure is applied between said bottom wall and said top closure, said bottom wall and said top closure being disposed in said module between said non-deformable upper and lower elements.

2. A module as defined in claim 1, in which said connecting means holding together said upper and lower elements comprise heat-resistant sealing means (10) for confining a controlled atmosphere within the interior of said module.

* * * * *